United States Patent [19]
Krysinski

[11] Patent Number: 5,732,905
[45] Date of Patent: Mar. 31, 1998

[54] SYSTEM FOR MINIMIZING THE DYNAMIC EXCITATION OF A HELICOPTER

[75] Inventor: Tomasz Krysinski, Marseille, France

[73] Assignee: Eurocopter France, Marignane Cedex, France

[21] Appl. No.: 613,512

[22] Filed: Mar. 11, 1996

[30] Foreign Application Priority Data

Mar. 10, 1995 [FR] France ................... 95 02802

[51] Int. Cl.⁶ .................................. B64C 27/04
[52] U.S. Cl. .................. 244/17.27; 244/17.13; 244/54
[58] Field of Search ................ 244/17.27, 17.11, 244/54, 17.13; 416/500; 188/314, 322.13, 299, 298, 318; 248/554–557

[56] References Cited

U.S. PATENT DOCUMENTS

| | | | |
|---|---|---|---|
| 2,756,989 | 7/1956 | Peras | 188/314 |
| 2,830,859 | 4/1958 | Parsons | 188/314 |
| 3,701,499 | 10/1972 | Schubert et al. | 244/17.27 |
| 3,752,270 | 8/1973 | Valdespino | 188/298 |
| 4,638,983 | 1/1987 | Idigkeit et al. | 244/17.27 |
| 4,811,919 | 3/1989 | Jones | 244/54 |
| 5,174,552 | 12/1992 | Hodgson et al. | 244/54 |
| 5,228,640 | 7/1993 | Mouille | 244/17.27 |
| 5,251,730 | 10/1993 | Ackermann et al. | 188/318 |
| 5,251,883 | 10/1993 | Simon et al. | 267/136 |
| 5,316,240 | 5/1994 | Girard et al. | 255/17.27 |

FOREIGN PATENT DOCUMENTS

| | | |
|---|---|---|
| 0 501 659 | 9/1992 | European Pat. Off. . |
| 0 511 055 A1 | 10/1992 | European Pat. Off. . |
| 0 530 075 A1 | 3/1993 | European Pat. Off. . |
| 2499505 | 8/1982 | France . |
| 2566078 | 12/1985 | France . |
| 2629545 | 10/1989 | France . |
| 2669982 | 6/1992 | France . |
| 2678032 | 12/1992 | France . |
| 1182339 | 2/1970 | United Kingdom . |
| 2160840 | 1/1986 | United Kingdom ............ 244/17.27 |

*Primary Examiner*—Galen L. Barefoot
*Attorney, Agent, or Firm*—Fisher, Christen & Sabol

[57] ABSTRACT

System for minimizing the dynamic excitation at the center of gravity of the fuselage of a helicopter, this excitation being brought about by the forces transmitted between the main transmission box and the fuselage, these two components being joined together by suspension bars which each have an elastic linkage device.

According to the invention, each elastic linkage device (2) comprises a cylinder (10), subdivided into two chambers (11, 12) by a piston (13) connected by springs to the two corresponding opposite internal faces (10a, 10b) of the cylinder (10), and the chambers (11, 12) of the cylinder (10) are additionally connected to one another by a pipe (17) which has a small cross section compared with that of the cylinder (10). A computer (6) pilots the movement of liquid in said pipe (17).

1 Claim, 3 Drawing Sheets

SYSTEM FOR MINIMIZING THE DYNAMIC EXCITATION OF A HELICOPTER

The present invention relates to a system for minimizing the dynamic excitation at the center of gravity of the fuselage of a helicopter. This dynamic excitation is brought about by the forces, generated by the rotor, transmitted between the main transmission box and the fuselage, these two components being joined together by suspension bars which each exhibit an elastic linkage device.

Indeed, one of the fundamental problems of helicopters stems from the overall level of vibration which plays a key part, on the one hand, in the level of cyclic stresses throughout the machine (and consequently the fatigue strength and thus the longevity of the components) and, on the other hand, in the comfort in the cabin and vibrations of the controls.

The objective of much research has therefore been to attenuate, if not to completely cancel out, this level of vibration inherent in the very operation of the rotor which not only transmits to the hub forces and static or almost static moments created by:

the lift (perpendicular to the plane of the rotor), the drag (parallel to the horizontal speed $V_H$ of the machine), the drift force (perpendicular to the previous two) which remains almost zero, but also forces and periodic moments stemming from the aerodynamic dissymmetries (lift and drag of the profile) which arise as the blades rotate, these being essentially due to $V_H$ in high-speed translational flight, or alternatively from the dissymmetries resulting from the non-uniform distribution of speeds induced on the rotor disc at low speed (transition zone). These cyclic aerodynamic moments and forces are transmitted to the center of the rotor after having been attenuated or amplified by the blades.

Specific means for minimizing the transmissibility coefficient (ratio of the amplitude of the forces or moments transmitted to the fuselage to that of the forces or moments applied to the head of the rotor), which in some way characterizes the effectiveness of these means described, in particular, in the Patents FR-2 499 505, FR-2 629 545, FR-2 669 982 and FR-2 678 032.

In general, in these known structures, the objective is cancel out (using "passive" means) the forces which are transmitted between the main transmission box and the fuselage. However, canceling out the forces is not always sufficient for reducing (let alone canceling out, or at the very least minimizing) the vibration of the fuselage owing to the mechanical linkage (support) which there is between the bottom of the main transmission box and the fuselage.

In particular, even if the forces in the suspension bars between the main transmission box and the fuselage are zero, the excitation force acting on the fuselage via the bottom of the main transmission box causes an excitation moment at the elastic center of the fuselage, and this causes vibration in the cabin.

The object of the present invention is to avoid this drawback.

To this end, the system for minimizing the dynamic excitation at the center of gravity of the fuselage of a helicopter, this excitation being brought about by the forces transmitted between the main transmission box and the fuselage, these two components being joined together by suspension bars which each have an elastic linkage device, said system comprising:

control means, each one associated with each of said elastic linkage devices, a plurality of sensors, especially such as accelerometers, arranged on said fuselage, and a computer connected, on the one hand, to each of said sensors and, on the other hand, to each of said control means, said computer, depending on the information received from said sensors, supplying orders to said control means in order to generate, in said elastic linkage means, dynamic forces intended to minimize said dynamic excitation at the center of gravity of the fuselage of the helicopter, is noteworthy, according to the invention, in that each elastic linkage device comprises a cylinder, subdivided into two chambers by a piston connected by springs to the two corresponding opposite internal faces of the cylinder, and in that the chambers of the cylinder are additionally connected to one another by a pipe which has a small cross section compared with that of the cylinder.

Thus, the present invention is no longer a case of canceling out forces in the bars connecting the main transmission box and the fuselage, but of canceling (in fact minimizing) the dynamic excitation at the center of gravity of the fuselage. Canceling out the dynamic forces at the center of gravity guarantees the absence of vibration throughout the structure, which amounts to using the elastic linkage devices not now as resonators, but as force generators.

In other words, the system according to the invention is particularly well suited to minimizing the dynamic responses of helicopter fuselages subjected to forces and to excitation moments which are dynamic, these constituting the reactions on the hub which are due to the dynamic forces (cyclic and periodic) generated by the blades, the fundamental frequency of which is the rotational frequency of the rotor.

The present invention makes it possible to minimize, at the center of gravity of the helicopter, the effects of the forces and of the moments whose axes are within the plane of the rotor. Comfort is thus improved, both in roll and pitch and in terms of the longitudinal or transverse swaying motion.

Various means may be used for controlling each elastic linkage device, as defined hereinabove, using said computer, namely by acting on the pressure drops in said pipe, or on the volume of one chamber of said cylinder, or on the pressure in said pipe.

In the first instance, the pressure drops in said pipe may be controlled by an assembly formed of an actuator, of a spring and of a piston closing said pipe to a greater or lesser extent.

In the second instance, the volume of the chamber of said cylinder can be controlled by an assembly formed of an actuator, of a spring, and of a piston occupying the transverse section of the cylinder.

In the third instance, the pressure in said pipe can be controlled by a dual assembly, arranged in the pipe, of actuators, of springs and of pistons occupying the transverse section of the pipe.

The Figures of the appended drawing will make it easy to understand how the invention may be achieved. In these Figures, identical references denote similar elements.

FIG. 1 diagrammatically shows a helicopter equipped with the system according to the invention.

Figure 1:
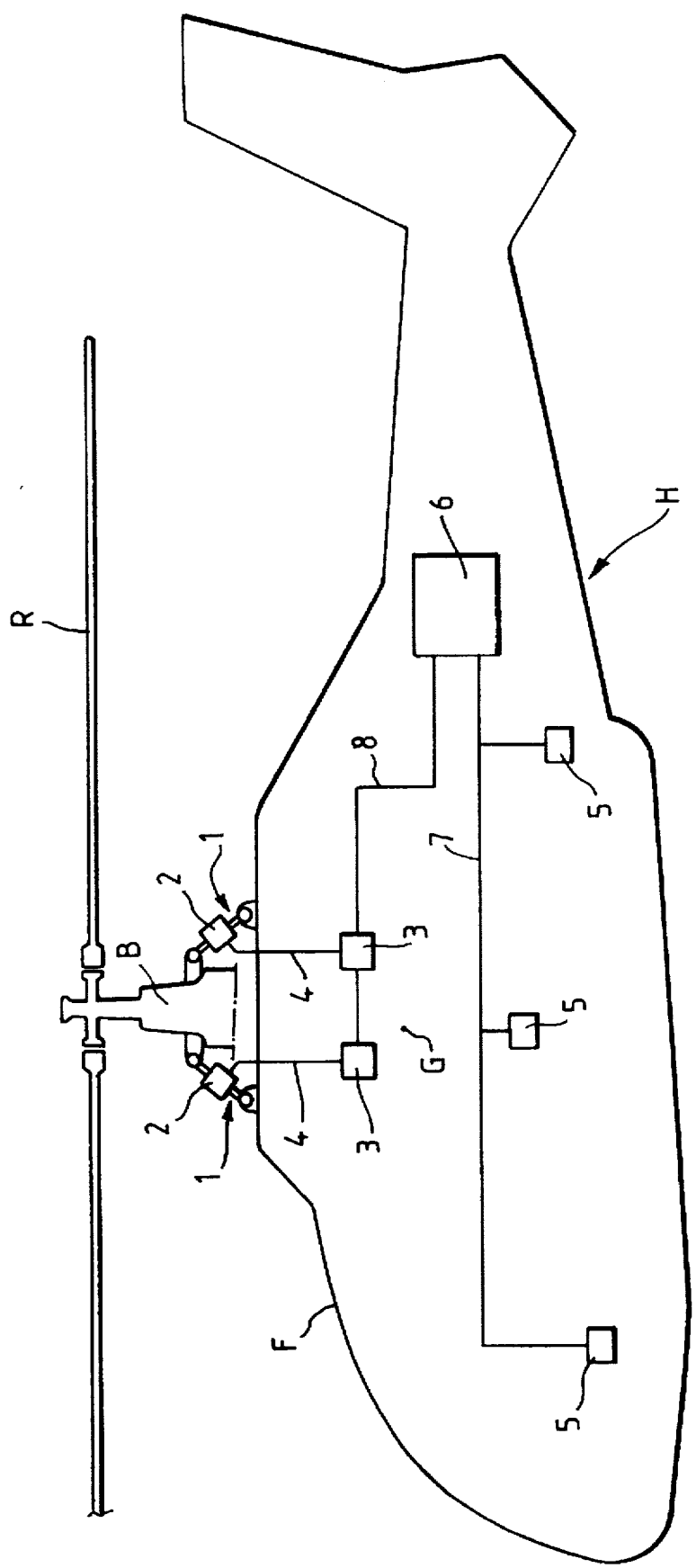

Represented diagrammatically in FIG. 1 is a helicopter H including a system, according to the invention, for minimizing the dynamic excitation at the center of gravity G of the fuselage F thereof. This dynamic excitation is generated by the forces transmitted between the main transmission box B, bearing the rotor R, and the fuselage F, these components being joined together by suspension bars 1, especially four in number, each of which exhibits an elastic linkage device 2. This elastic linkage device 2 may be of various sorts, for example the one described in Patent FR-2 678 032 or the one described in detail hereafter.

In general, the system according to the invention comprises:

control means 3, each one associated with each of the elastic linkage devices 2 to which they are connected by a line 4, a plurality of sensors 5, especially such as accelerometers, arranged on the fuselage F, and a computer 6 connected, on the one hand, to each of the sensors 5 by a line 7 and, on the other hand, to each of said control means 3 by a line 8, the computer 6, depending on the information received from said sensors 5, supplying orders to the control means 3 in order to generate, in the elastic linkage means 2, dynamic forces intended to minimize said dynamic excitation at the center of gravity G of the fuselage F of the helicopter H.

Figure 2:
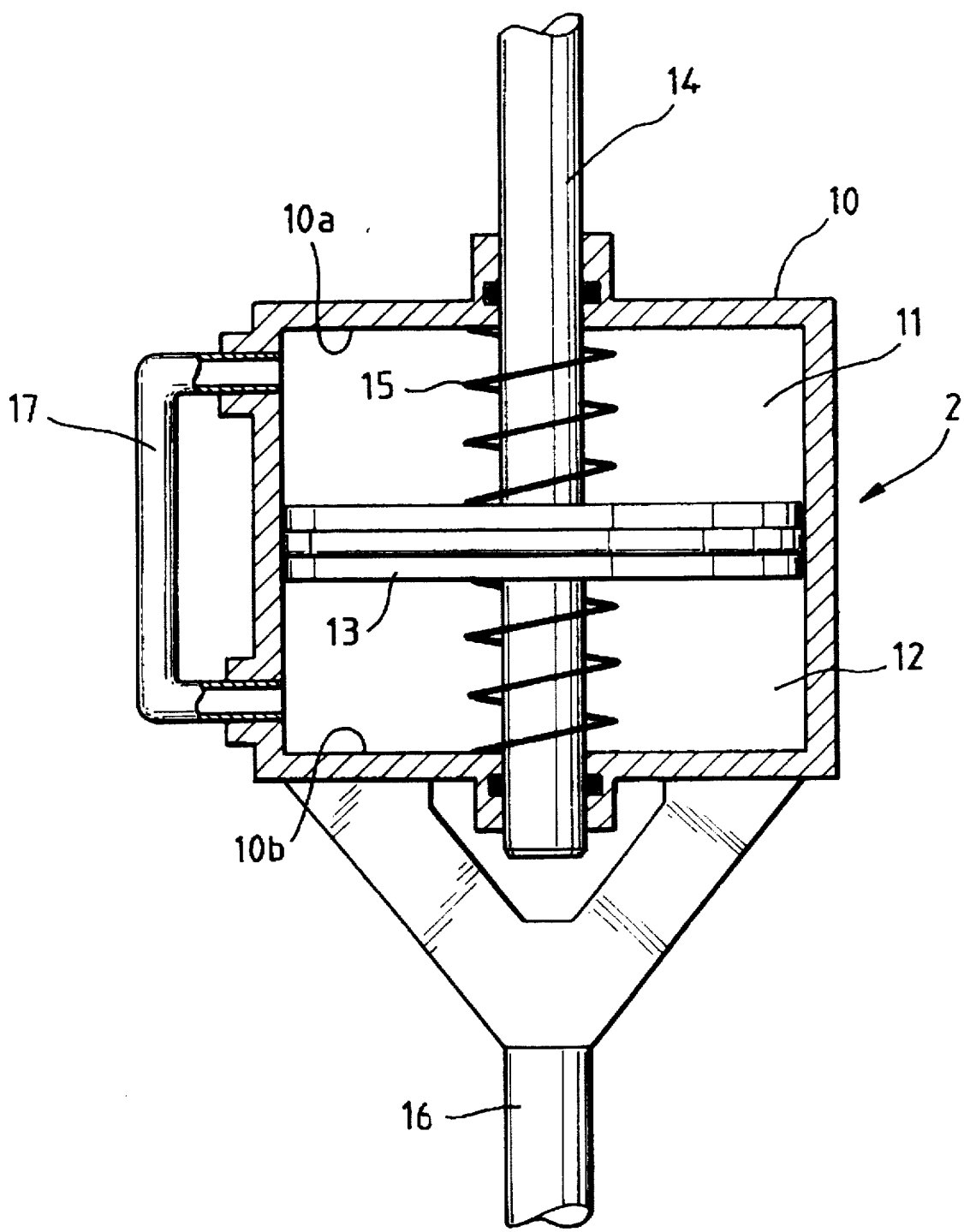
FIG. 2 is a view in part section of an elastic linkage device provided between the main transmission box and the fuselage of a helicopter.

Each elastic linkage device 2 is as represented in FIG. 2. The elastic linkage device 2 comprises a cylinder 10, subdivided into two chambers 11 and 12, filled with oil, by a piston 13 secured to a piston rod 14 passing through the cylinder 10 and surrounded by coil springs 15 pressing respectively, on the one hand, on the opposite faces of the piston 13 and, on the other hand, on the two corresponding opposite internal faces 10a, 10b of the cylinder 10. In addition, the rod 14 is connected to the main transmission box B (FIG. 1), while a bar 16 secured to the bottom of the cylinder 10 is connected to the fuselage F (FIG. 1). Moreover, the chambers 11 and 12 of the cylinder 10 are connected to one another by a pipe 17 which has a small transverse section compared with that of the cylinder 10.

According to the invention, the movement of liquid in the pipe 17 is piloted, via the computer 6 and the control means 3 and in the various ways described hereafter, to minimize the dynamic excitation at the center of gravity G of the fuselage F. For this purpose it is necessary to generate in the suspension bars 1, between the main transmission box B and the fuselage F, forces of opposite phase to the phase of the excitation force, and with matching modulus.

Figure 4:
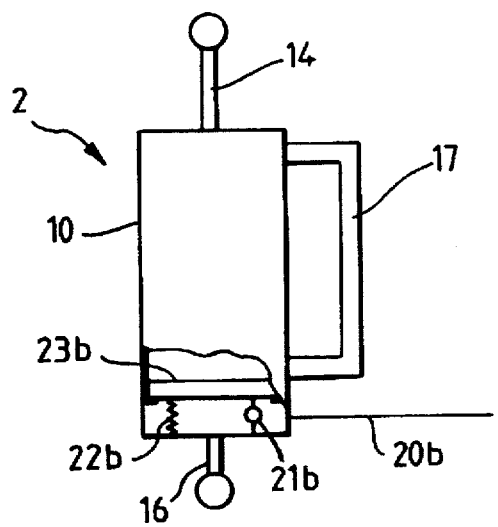
Figure 5:
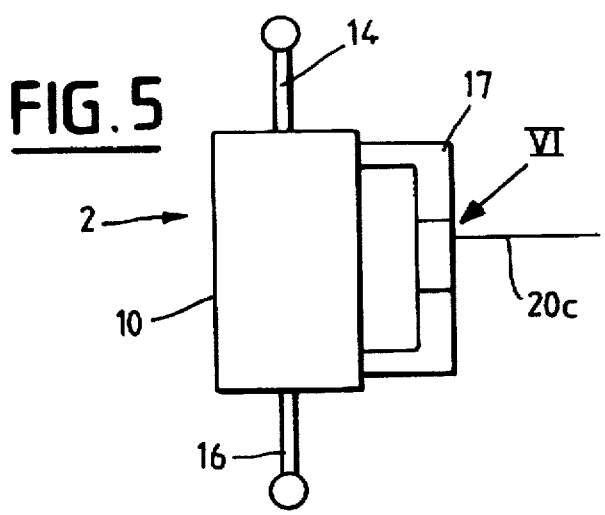
Figure 6:
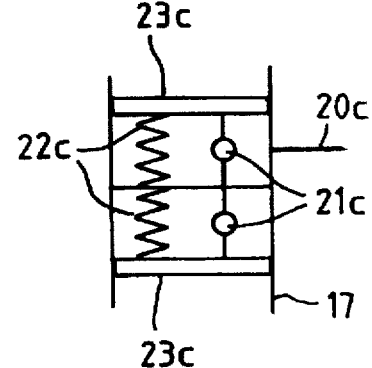

The control of the elastic linkage devices 2 (fluid inertia resonators) is thus determined by the computer 6 in real time on the basis of the response of all the sensors 5 representing that which it is desired to minimize (cabin accelerometers for example). As illustrated by FIGS. 3 to 6, this active control may act on the characteristics of the resonators 2, such as the pressure drops in the pipe 17 (FIG. 3), the volume of one cylinder 10 chamber (FIG. 4), or the pressure in the pipe 17 (FIGS. 5 and 6).

Figure 3:
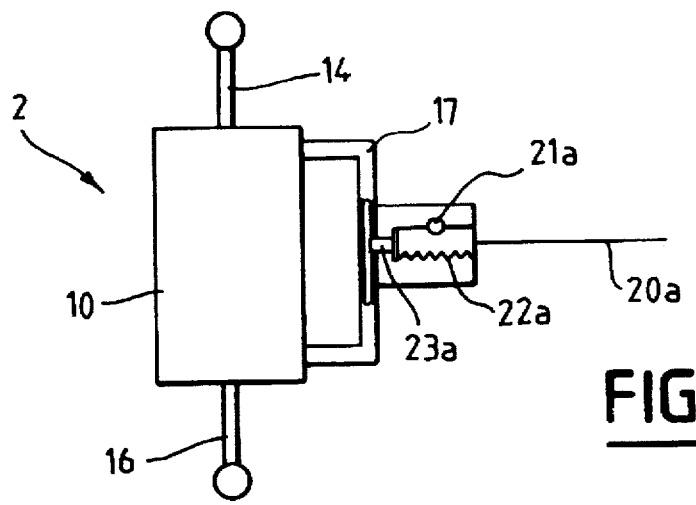
FIGS. 3 to 6 illustrate various ways by which the computer can control each elastic linkage device of the system according to the invention.

More specifically, FIG. 3 shows that the pressure drops in the pipe 17 may be influenced, under the control of the computer 6 (line 20a), by an assembly formed of an actuator 21a, of a spring 22a and of a piston 23a closing the pipe 17 to a greater or lesser extent. Likewise, as FIG. 4 shows, the volume of the cylinder 10 may be influenced, under the control of the computer 6 (line 20b), by an assembly formed of an actuator 21b, of a spring 22b and of a piston 23b occupying the transverse section of the cylinder 10.

Also, as shown in FIGS. 5 and 6, the pressure in the pipe 17 may be influenced, under the control of the computer 6 (line 20c), by a dual assembly, arranged in the pipe 17, of actuators 21c, of springs 22c and of pistons 23c occupying the transverse section of the pipe 17.

The parameters, mass (piston) and stiffness (spring) are optimized, in each case, to correspond to the excitation frequency. As a result, the actuator excites the system at its natural frequency which makes it possible, with low loadings generated by the actuator, to obtain substantial movements of the mass. It is thus possible to use a low energy and therefore lightweight actuator of the piezoelectric type, for example.

I claim:

1. A system for minimizing the dynamic excitation at the center of gravity of the fuselage of a helicopter, this excitation being brought about by the forces transmitted between the main transmission box and the fuselage, these two components being joined together by suspension bars which each have an elastic linkage device, the system comprising:

control means (3), each one associated with each of said elastic linkage devices (2), a plurality of sensors (5), especially such as accelerometers, arranged on said fuselage (F), and a computer (6) connected, on the one hand, to each of said sensors (5) and, on the other hand, to each of said control means (3), said computer (6), depending on the information received from said sensors (5), supplying orders to said control means (3) in order to generate, in said elastic linkage means (2), dynamic forces intended to minimize said dynamic excitation at the center of gravity (G) of the fuselage (F) of the helicopter (H), wherein each elastic linkage device (2) comprises a cylinder (10), subdivided into two chambers (11, 12) by a piston (13) connected by springs to the two corresponding opposite internal faces (10a, 10b) of the cylinder (10), wherein the chambers (11, 12) of the cylinder (10) are additionally connected to one another by a pipe (17) which has a small cross section compared with that of the cylinder (10), and wherein the control of each elastic linkage device (2) is determined by said computer (6) acting on the pressure in said pipe (17), and the pressure in said pipe (17) is controlled by a dual assembly, arranged in the pipe (17), of actuators (21c), of springs (22c) and of pistons (23c) occupying the transverse section of the pipe (17).

* * * * *